(12) United States Patent
Kaufman et al.

(10) Patent No.: US 6,973,179 B1
(45) Date of Patent: Dec. 6, 2005

(54) POCKET SPEAKERPHONE

(75) Inventors: Steven B. Kaufman, Bridgewater, NJ (US); John P. Veschi, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/151,670

(22) Filed: Sep. 11, 1998

(51) Int. Cl.$^7$ .............................................. H04M 9/00
(52) U.S. Cl. ........................ 379/388.02; 379/387.01; 379/388.01
(58) Field of Search ................ 379/388.01, 388.02, 379/202.02, 406.08, 433.02, 387.01, 202.01, 379/419, 420.01, 420.06, 420.03, 420.04

(56) References Cited

U.S. PATENT DOCUMENTS

| | | | |
|---|---|---|---|
| 4,682,957 A * | 7/1987 | Young | 379/202.02 |
| 4,907,267 A * | 3/1990 | Gutzmer | 379/442 |
| 4,912,758 A | 3/1990 | Arbel | 379/406.08 |
| 4,930,156 A * | 5/1990 | Norris | 379/388.02 |
| 5,099,514 A | 3/1992 | Acree | 379/441 |
| 5,450,481 A * | 9/1995 | Penzias | 379/202.01 |
| 5,600,714 A * | 2/1997 | Eppler, Jr. et al. | 379/406.08 |
| 5,623,544 A | 4/1997 | Papadopoulos | 379/413 |
| 6,002,945 A * | 12/1999 | McDuffee | 455/556 |
| 6,212,273 B1 * | 4/2001 | Hemkumar et al. | 379/406.08 |

* cited by examiner

Primary Examiner—Jefferey F. Harold

(57) ABSTRACT

A pocket speakerphone adapter for a landline-based common telephone to provide the common telephone with speakerphone capabilities. The conventional handset of a conventional common telephone is disconnected from the handset jack of its base unit, and the pocket speakerphone is temporarily connected in its place to the handset jack of the base unit using a conventional handset cord. The conventional common telephone base unit provides interconnection with the public switched telephone network (PSTN), while the pocket speakerphone in accordance with the principles of the present invention provides a temporary adaptation of the land line common telephone to operate as a speakerphone.

23 Claims, 7 Drawing Sheets

POCKET SPEAKERPHONE

BACKGROUND OF THE INVENTION

1. Field of the Invention

This invention relates to speakerphones. More particularly, it relates to a portable speakerphone device which connects to the handset jack of a standard telephone device, thus converting the standard telephone device into a speakerphone.

2. Background of Related Art

Speakerphones have become an important part of telecommunications, allowing hands free operation of a telephone after a call has been made or received. Speakerphones take many shapes and forms, including as a land line telephone or as a hands free wireless or cellular telephone. The present invention relates to the temporary conversion of a landline telephone into a speakerphone.

Conventionally, speakerphones include the ability to converse either in a common telephone mode using an attached handset or, with the handset in a cradled position, using a microphone and speaker. Typically, the microphone and loudspeaker allow a person to speak and listen on a telephone call from distances anywhere from just a few feet to dozens of feet away from the speakerphone.

As is known, sounds output from the loudspeaker of a speakerphone can cause an open loop feedback problem into the microphone unless suppressed or eliminated, or unless operated in a half-duplex mode.

Conventionally, in a full-duplex mode, the effects of any feedback from the loudspeaker to the microphone are suppressed using a conventional audio echo canceller (AEC). An AEC suppresses or eliminates from the signal received from the microphone a representation of the signal going to the speaker. A delay mechanism in the AEC provides a delay in the suppression of the loudspeaker output from the microphone signal until the approximate time at which the sound travels to the microphone. Thus, the AEC takes into account the time it takes for sound to travel to the microphone.

One distance relevant to the audio echo canceller is the physical distance between the loudspeaker and microphone on the speakerphone. Other distances relate to the larger distances corresponding to echoes from the loudspeaker off of walls and/or the ceiling and back to the microphone.

Audio echo cancelers initially were constructed with analog components. More recently, digital algorithms operating in a processor such as a digital signal processor (DSP) have become more commonplace.

FIG. 6 depicts a block diagram of an exemplary conventional speakerphone 502.

In particular, the speakerphone 502 includes a hybrid or telephone line interface (TLI) 514, codecs 512, 560, and an audio echo canceller 592. The speakerphone 502 typically also includes a hybrid echo canceller (not shown) to cancel reflections caused by the TLI 514. The HEC algorithm may be included in the same DSP as the AEC algorithm.

Signals received from the central office 13 over the telephone line 506 are digitized by the codec 512. Feedback related audio signals are suppressed or eliminated by the AEC 592. The AEC helps prevent the possibility that feedback of audio from the loudspeaker to the microphone would cause undesirable squealing and other uncomfortable noise. Thus, the AEC algorithm minimizes acoustic feedback. The AEC algorithm may be an adaptive, speech trained acoustic echo canceller, and is typically under the control of a host processor.

The codec 590 converts the audio (and hybrid) echo suppressed signals back into analog signals for output by the loudspeaker 212. Similarly, signals received from the microphone 214 are digitized by the codec 560, and buffered in the AEC 592 for use, e.g., in the adaptive suppression of echoes. The digital signals are converted back into analog signals by the codec 512, and transmitted by the TLI 514 over the telephone line 506 directly to the central office 13.

In operation, a signal is received from the telephone line 506 via the hybrid or telephone line interface (TLI) 514 and codec 512. An analog-to-digital converter within a DSP implementing the AEC 592 and HEC (not shown) can be used to replace the codec 512 shown in FIG. 6 in cost sensitive applications.

The DSP forming the AEC 592 may be a dedicated processor or may double as a host processor. Alternatively, a separate microcontroller, microprocessor, or other processor may serve as a host processor for the speakerphone 502. The amount of acoustic echo cancellation provided by the AEC algorithm may be monitored by the DSP and adjusted as necessary for optimal performance of the speakerphone 502.

FIG. 7 shows a typical use of a conventional speakerphone 502 such as that shown in FIG. 6.

In particular, a speakerphone 502 is connected directly to a central office 13 via a telephone line 506. Other, common telephones 500 may be connected to the same telephone line 506 or to a different telephone line to the central office 13. When a user at the common telephone 500 requires use of a speakerphone, they must locate and utilize the speakerphone 502. There is no conventional technique or apparatus to allow use of the common telephone 500 as a speakerphone.

Speakerphones, while commonplace, are not always conveniently located. For instance, many hotel rooms include only a common telephone. Unfortunately, situations arise where it would be convenient to have access to a speakerphone. For instance, whenever two or more persons would like to speak on a common telephone. Unfortunately, in such a case, the users either must use separate telephones, typically located on separate extensions in separate rooms, or must temporarily install an entire speakerphone 502 at the desired location. Neither solution is optimal.

There is thus a need for a convenient technique and apparatus for temporarily adapting a conventional common telephone as a speakerphone on an as needed basis.

SUMMARY OF THE INVENTION

In accordance with the principles of the present invention, an apparatus to adapt a common telephone for operation as a speakerphone comprises a loudspeaker and a microphone. An audio module is adapted for removable interface to a handset jack of a base unit of a common telephone.

A method of converting a common telephone into a speakerphone in accordance with the principles of the present invention comprises removing a handset connection between a handset and a base of the common telephone, and temporarily connecting a loudspeaker and a microphone to the handset connection on the base.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a pocket speakerphone adapter for a landline-based common telephone to provide the common telephone with speakerphone capabilities. The pocket speakerphone is plugged into the handset jack of a conventional base unit of the common telephone, and the conventional common telephone base unit provides interconnection with the public switched telephone network (PSTN).

Figure 1:
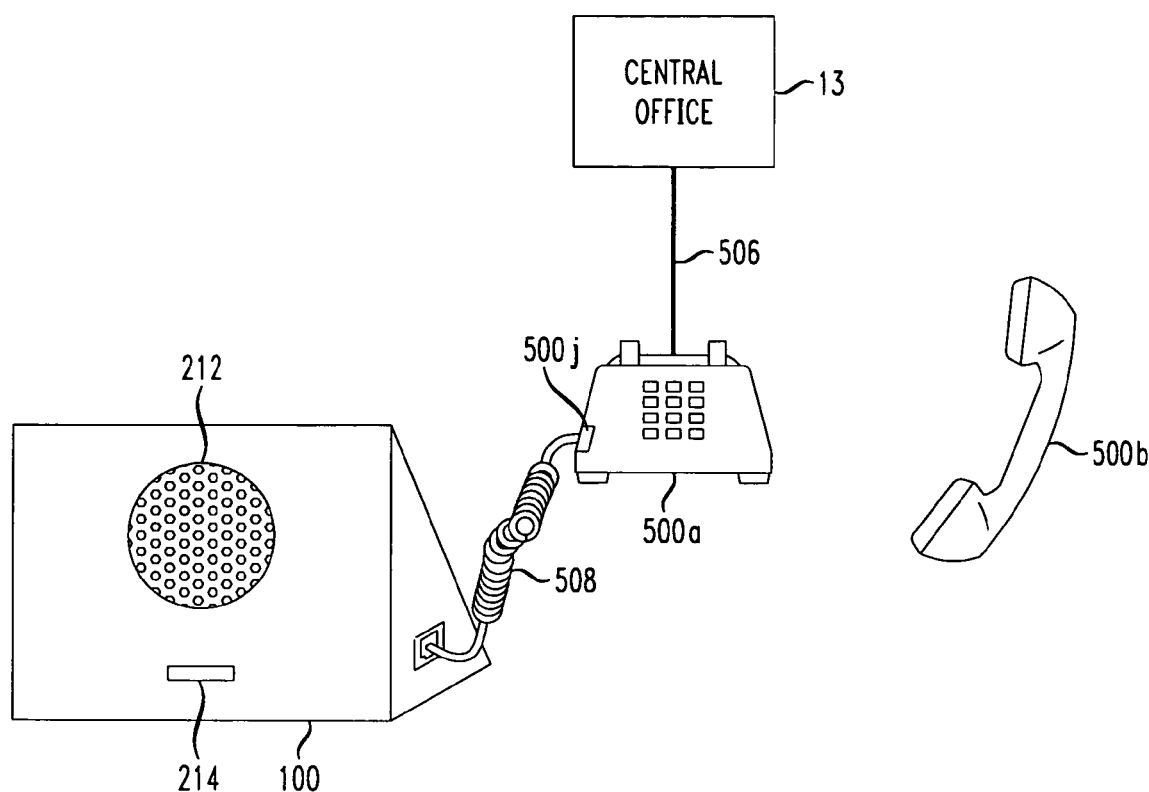
FIG. 1 shows a pocket speakerphone for use with the base of a conventional common telephone, in accordance with the principles of the present invention.

FIG. 1 shows a first embodiment of a pocket speakerphone 100 in accordance with the principles of the present invention.

In particular, FIG. 1 shows a pocket speakerphone 100 interconnected with the base unit 500a of a common telephone 500a. In the preferred embodiment, the handset 500b of the conventional common telephone 500 is disconnected from the handset jack 500j of the base unit 500a, and the pocket speakerphone 100 is connected in its place to the handset jack of the base unit 500a using a conventional handset cord 508.

The base unit 500a is connected to the central office 13 over a conventional telephone line 506, and is responsible for providing the proper impedance on the telephone line 506, e.g., both in an on-hook condition and in an off-hook condition.

In the first embodiment as shown in FIG. 1, the handset 500b of the common telephone 500 is preferably replaced with the pocket speakerphone 100, and therefore the handset 500b is set aside and unused while the pocket speakerphone 100 is in use.

The pocket speakerphone 100 includes a loudspeaker 212 and a microphone 214, and suitable amplifiers to provide levels of audio input and output in accordance with the needs of the particular application. The specific loudspeaker 212, microphone 214 and amplifiers used in the pocket speakerphone 100 are the same as those used in conventional speakerphone devices.

The disclosed embodiment is a small, pocket-sized speakerphone 100. Preferably, to minimize size and cost, the pocket speakerphone 100 provides only essential functions of a speakerphone to allow hands free operation of a land line telephone. However, other speakerphone features and/or components may be included within the principles of the present invention so long as the pocket speakerphone 100 remains temporarily adaptable for connection with the handset jack 500j of the base unit 500a of a common telephone 500.

Importantly, as can be seen in FIG. 1, the pocket speakerphone 100 connects to the handset jack 500j of the conventional common telephone and not directly to the telephone line 506. This off-loads the responsibility to the base unit of the common telephone 500 for providing proper impedance to the central office 13 over the telephone line 506.

The pocket speakerphone 100 need not include a telephone line interface (TLI) or similar circuit to provide the proper AC and DC levels to the telephone line 506. Instead, the base unit 500a of the common telephone 500 includes a conventional TLI which is responsible for providing the proper impedance to the telephone line 506. Nevertheless, the pocket speakerphone 100 may include a TLI if desirable to provide electrical isolation.

Figure 2:
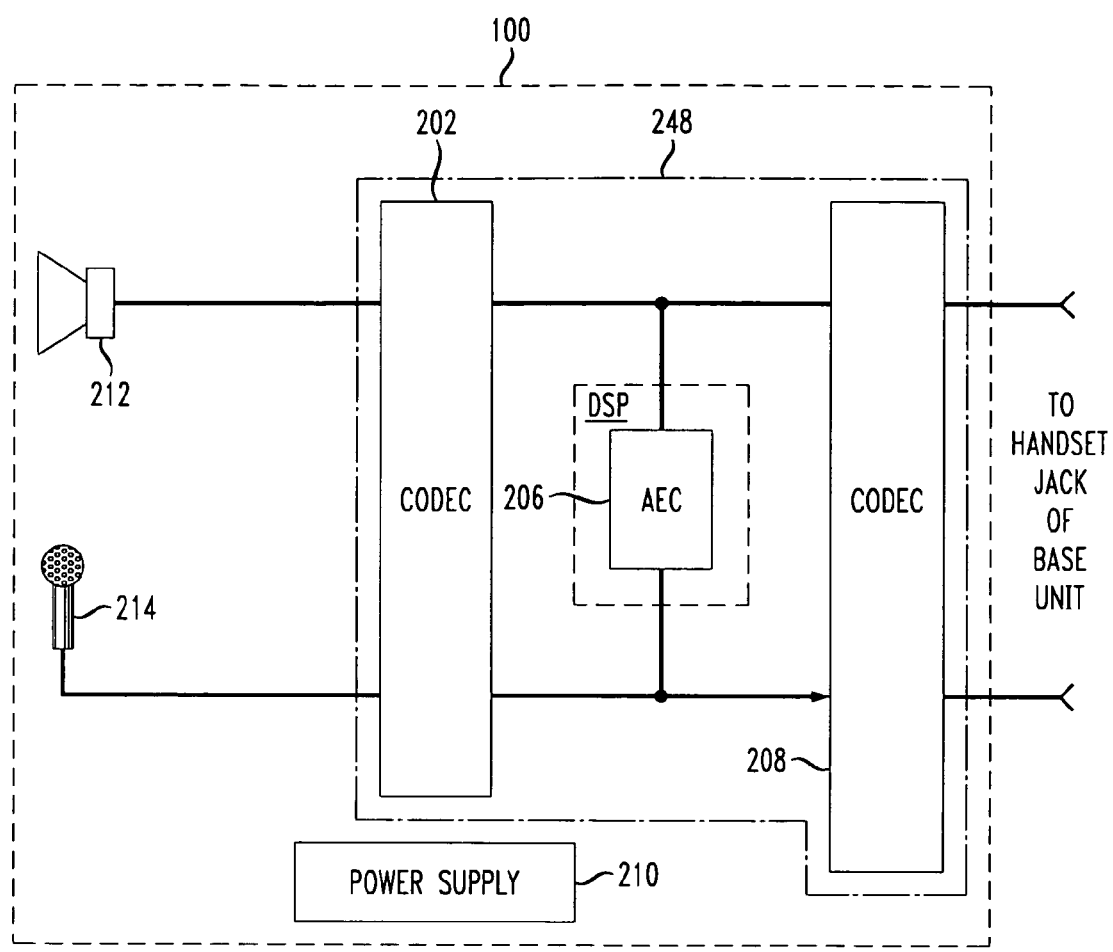
FIG. 2 shows a block diagram of the pocket speakerphone shown in FIG. 1.

FIG. 2 is a block diagram showing an implementation of the first embodiment of a pocket speakerphone 100 as shown in FIG. 1.

In particular, the pocket speakerphone 100 includes the loudspeaker 212 and microphone 214 and a suitable audio module 248 to drive the loudspeaker 212 with the signals received from the handset jack 500j of the base unit 500a (FIG. 1), and to receive and amplify as necessary the signals input to the microphone 214.

The audio module 248 may be digital based as shown in the disclosed embodiments, or it may be analog based. In the digital based audio module 248 shown in FIG. 2, codecs 208, 202 convert the analog signal from the handset jack 500j of the base unit 500a to digital signals for processing, e.g., for audio echo cancellation (and for hybrid echo cancellation if a TLI is used in the pocket speakerphone 100) by suitable algorithms in an appropriate processor such as a DSP, and back again to analog signals.

Moreover, the audio module 248 may be either full-duplex or half-duplex. If the audio module 248 of the pocket speakerphone 100 is full-duplex, the AEC 206 is required to suppress or eliminate undesirable feedback from the loudspeaker to the microphone input. If, on the other hand, the audio module 248 is half-duplex, the AEC 206 itself may be eliminated. In the half-duplex mode of operation, the pocket speakerphone 100 is either receiving input sounds through the microphone 214 above a certain threshold level, or outputting signals received from the telephone line 506 through the loudspeaker 212. The direction of the operation of the pocket speakerphone 100 with a half-duplex audio module 248 is determined based on an audio level detected by the microphone 214 in ways well known in the art.

The pocket speakerphone 100 includes a power supply 210 sufficient for providing all necessary power to the audio module 248 and any other necessary functions. The power supply 210 is preferably battery power to provide maximum portability, but may instead convert any suitable external source of DC or AC power into the DC voltage necessary to operate the audio module 248, e.g., into 3 or 4 volts DC.

Figure 3:
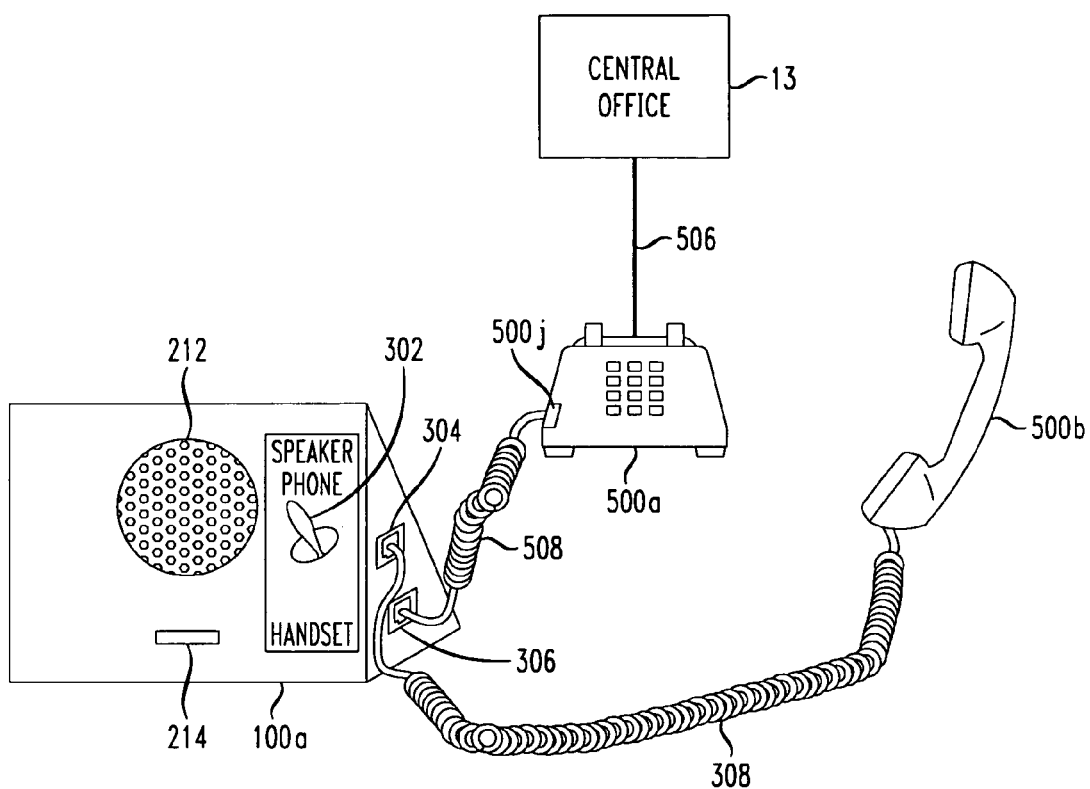
FIG. 3 shows another embodiment of a pocket speakerphone in accordance with the principles of the present invention.

FIG. 3 shows a second embodiment of a pocket speakerphone 100a in accordance with the principles of the present invention. This second embodiment intercepts the signal between the conventional based unit 500a and handset 500b and provides switchable operation of the pocket speakerphone 100a.

In particular, the second embodiment of the pocket speakerphone 100a is similar to that shown in FIGS. 1 and 2 but for the addition of a switch function 302 to allow use of either the handset 500b of the common telephone 500 or the speakerphone functionality provided by the pocket speakerphone 100a.

Although the switch 302 is shown in FIG. 3 as a mechanical or electrical switch, it is to be understood that the switch 302 represents any electrical or mechanical apparatus which provides switchability in the signal to the handset jack 500*j* of the base unit 500*a* of the common telephone 500. For instance, in one mode, the switch function 302 provides signals with respect to the pocket speakerphone 100 to the base unit 500*a*. In another mode, the switch function 302 provides conventional functionality by connecting the handset 500*b* directly to the base unit 500*a*.

The switch function 302 may be operable by a physical placement of a component of the common telephone 500. For instance, the switch function 302 may be caused to connect the pocket speakerphone 100*a* to the handset jack 500*j* of the base unit 500*a* when the base unit 500*a* is in an off-hook condition and the handset 500*b* is rested in a predetermined location, e.g., in the on-hook cradle. Preferably, before placing the handset 500*b* on the cradle, the user will depress a key on a keypad of the base unit 500*a* indicating that the placement of the handset 500*b* in the cradle is not to cause an on-hook condition.

Figure 4:
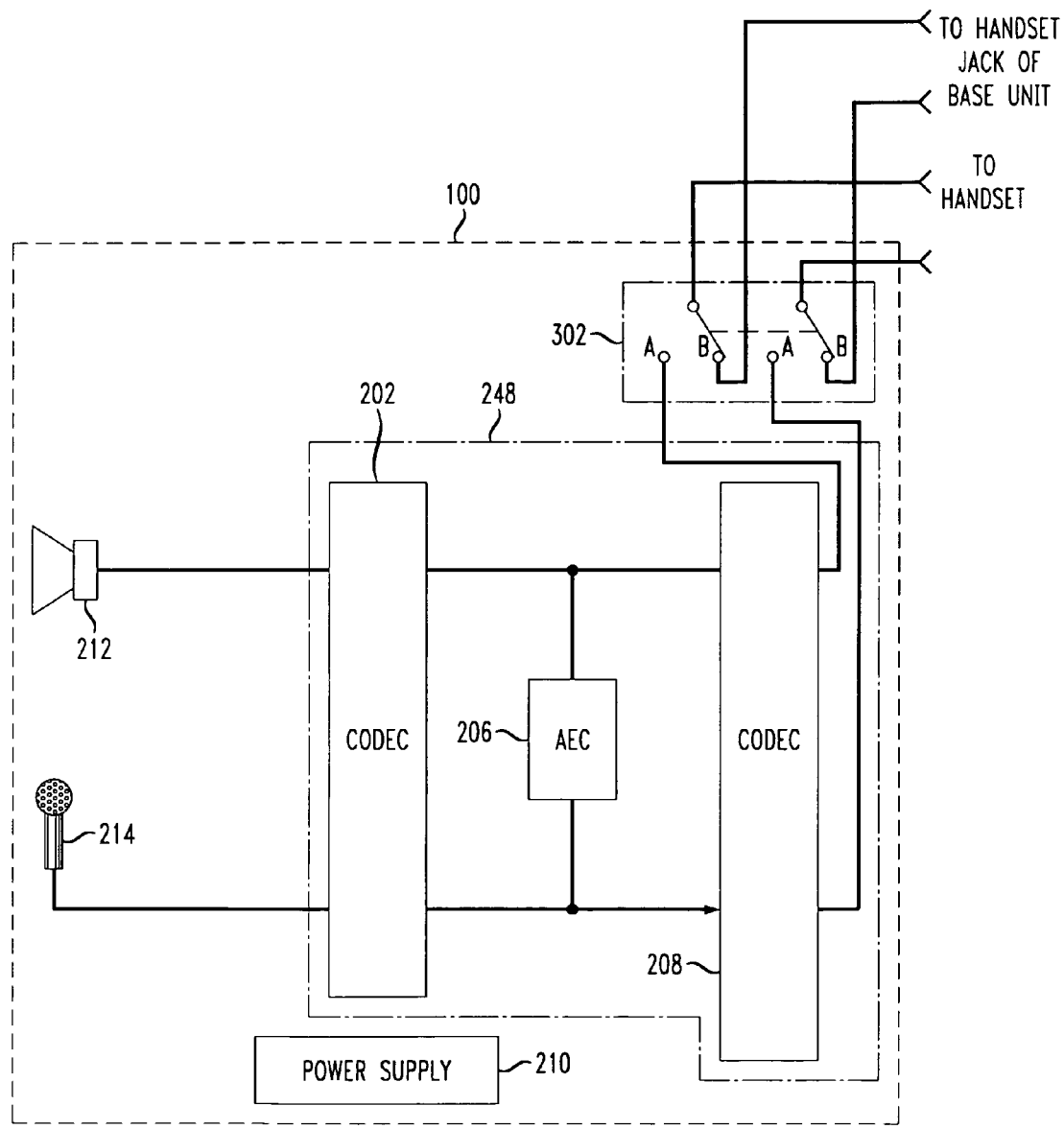
FIG. 4 shows a block diagram of the pocket speakerphone shown in FIG. 3.

FIG. 4 is similar to FIG. 2, but additionally shows the switch function 302 in more detail.

In particular, the switch function 302 is a double pole, double throw (DPDT) type switching function having two positions or modes. In a first position or mode A, the audio module 248 is electrically connected to the handset cord 508 to the handset jack 500*j* of the base unit 500*a*. In a second position or mode B, the conventional handset 500*b* is connected directly to the handset cord 508 and handset jack 500*j* of the base unit 500*a* to provide conventional common telephone functionality.

Figure 5:
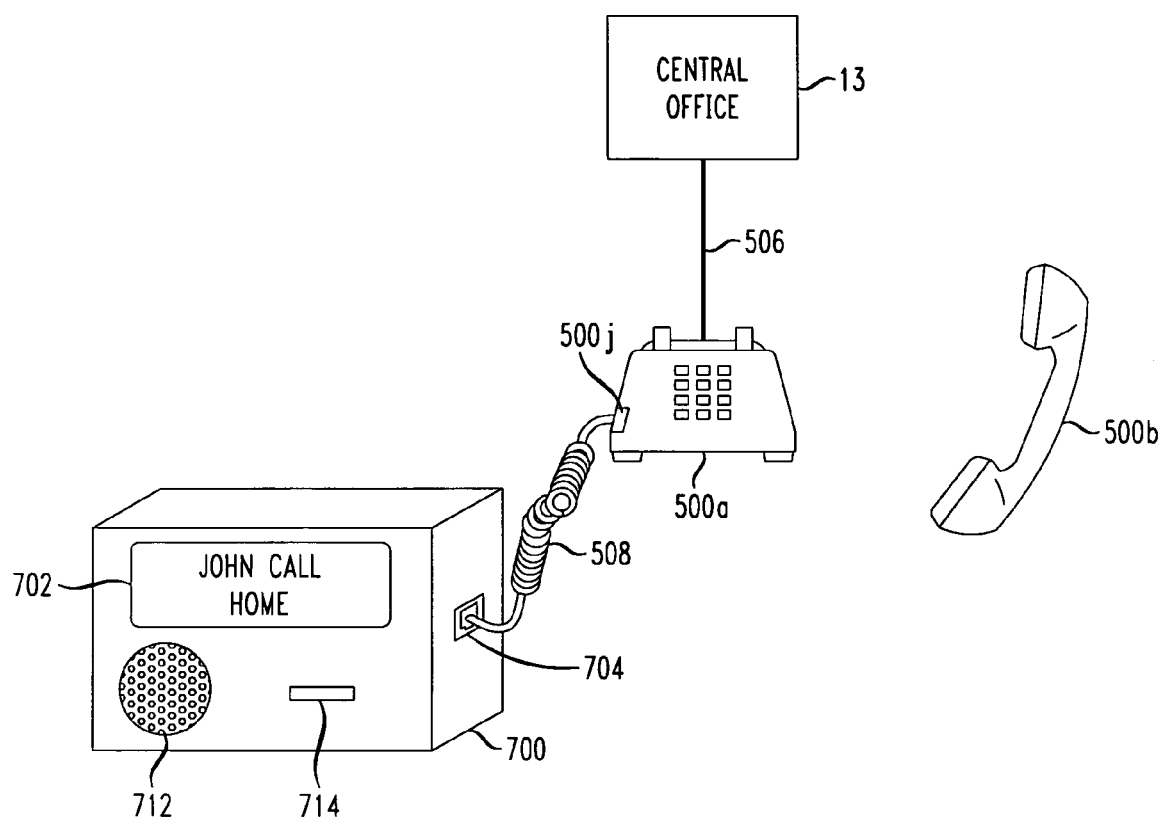
FIG. 5 shows another embodiment of a pocket speakerphone wherein a voice pager is used to provide a speakerphone output.
Figure 6:
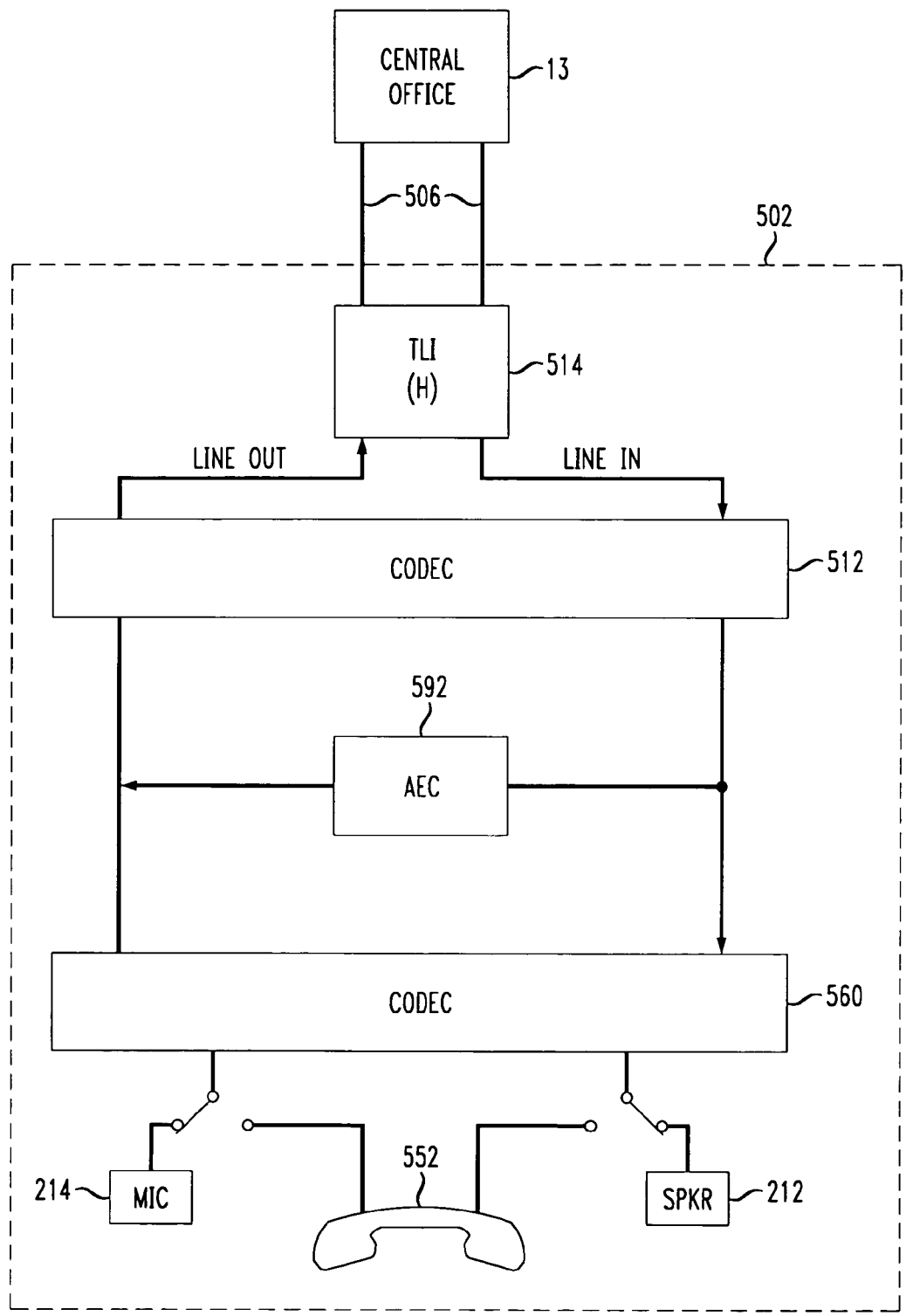
FIG. 6 depicts a block diagram of a conventional speakerphone.
Figure 7:
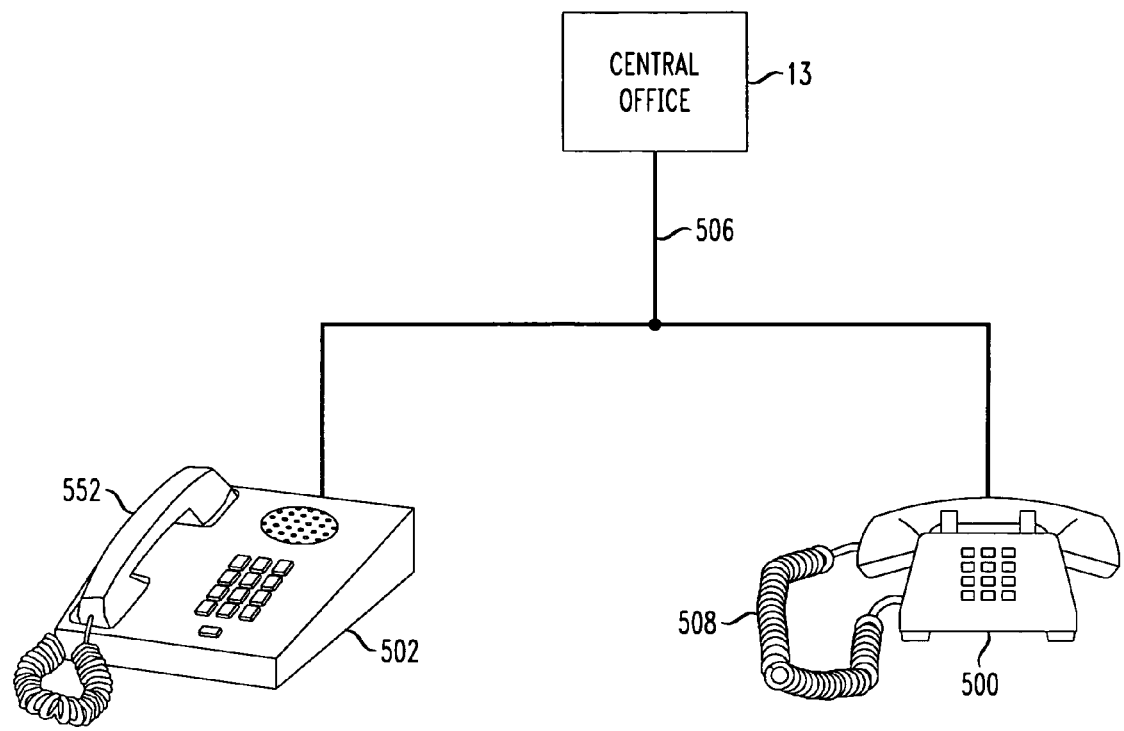
FIG. 7 shows both a conventional speakerphone and a common telephone in connection with a central office.

FIG. 5 shows another embodiment of a pocket speakerphone 700 comprised of an otherwise conventional voice pager together with speakerphone capabilities. In particular, the pocket speakerphone 700 includes a conventional paging display 702 for displaying conventional paging messages, and a speaker 712 for playing voice pages. However, in addition to the conventional components of a voice pager, the pocket speakerphone 700 in this embodiment includes a microphone 714 for use with the speakerphone operability. Moreover, the speaker 712 and appropriate amplifiers are also used in the pocket speakerphone mode for outputting the audio signal on a telephone line 506 when connected in place of the handset 500*b* of a conventional telephone 500*a*.

When not connected to the telephone 500*a*, the pocket speakerphone 700 operates as a conventional voice pager. However, upon connection to the handset cord 508, the pocket speakerphone 700 enters a speakerphone mode which presents audio input to the microphone 704 to the handset cord 508, and which plays audio from the handset cord 508 on the speaker 712.

Of course, a controller in the pocket speakerphone 700 preferably includes an appropriate audio echo canceler (AEC) for suppressing or eliminating any echoes or other undesirable feedback from the walls or furniture in the room in which the pocket speakerphone 700 is temporarily installed.

While the disclosed embodiment relates to a digital speakerphone 100, the present invention is equally applicable to analog speakerphones.

While the invention has been described with reference to the exemplary preferred embodiments thereof, those skilled in the art will be able to make various modifications to the described embodiments of the invention without departing from the true spirit and scope of the invention.

We claim:

1. Apparatus to adapt a common telephone for operation as a speakerphone, comprising:
    a speakerphone loudspeaker for producing sounds in a local vicinity of said apparatus;
    a speakerphone microphone adaptively attached to said apparatus;
    a handset jack interface for interfacing said apparatus to a handset jack of said common telephone; and
    an audio module adapted for removable interfacing to said handset jack of a base unit of said common telephone to adapt said common telephone for operation as a speakerphone through said speakerphone loudspeaker and said speakerphone microphone;
    wherein said apparatus is powered by a battery for portable transportation between common telephones and relies on said common telephone for dialing functions, ringing functions, and hook-switch functions.

2. The apparatus to adapt a common telephone for operation as a speakerphone according to claim 1, wherein:
    said apparatus is adapted to be operated in a half-duplex mode.

3. The apparatus to adapt a common telephone for operation as a speakerphone according to claim 1, wherein:
    said apparatus is adapted to operate in a full-duplex mode.

4. The apparatus to adapt a common telephone for operation as a speakerphone according to claim 3, further comprising:
    an audio echo canceler.

5. The apparatus to adapt a common telephone for operation as a speakerphone according to claim 4, wherein:
    said audio echo canceler is an algorithm included in a digital signal processor.

6. The apparatus to adapt a common telephone for operation as a speakerphone according to claim 5, wherein said digital signal processor further includes:
    a hybrid echo canceler.

7. The apparatus to adapt a common telephone for operation as a speakerphone according to claim 1, wherein said audio module comprises:
    a first codec for converting a signal to and from said handset jack of said base unit of said telephone between analog and digital signals;
    an echo canceler; and
    a second codec for converting a signal to said speakerphone loudspeaker and a signal from said speakerphone microphone into respective analog and digital signals.

8. The apparatus to adapt a common telephone for operation as a speakerphone according to claim 7, wherein said echo canceler comprises:
    an audio echo canceler.

9. The apparatus to adapt a common telephone for operation as a speakerphone according to claim 8, wherein said echo canceler further comprises:
    a hybrid echo canceler.

10. The apparatus to adapt a common telephone for operation as a speakerphone according to claim 1, wherein:
    said audio module is adapted and arranged for direct connection to said base unit of said telephone without use of a telephone line interface.

11. The apparatus to adapt a common telephone for operation as a speakerphone according to claim 1, further comprising:
    a telephone line interface.

12. The apparatus to adapt a common telephone for operation as a speakerphone according to claim 1, further comprising:
- a switch;
- said switch having a first position which interconnects said handset to said handset jack of said telephone; and
- said switch having a second position which interconnects said audio module to said handset jack of said telephone.

13. The apparatus to adapt a common telephone for operation as a speakerphone according to claim 1, further comprising:
- a voice pager.

14. A method of converting a common telephone into a speakerphone, comprising:
- transporting a portable speakerphone loudspeaker and a portable speakerphone microphone to said common telephone;
- removing a handset connection between a handset and a base of a telephone;
- temporarily connecting said speakerphone loudspeaker and said speakerphone microphone to said handset connection on said base to convert said common telephone into a speakerphone;
- relying on a battery for powering said portable speakerphone loudspeaker and said portable speakerphone microphone; and
- relying on said common telephone for dialing functions, ringing functions, and hook-switch functions.

15. The method of converting a common telephone into a speakerphone according to claim 14, further comprising:
- amplifying an output of said handset connection on said base.

16. The method of converting a common telephone into a speakerphone according to claim 15, wherein:
- said amplifying is powered by battery.

17. The method of converting a common telephone into a speakerphone according to claim 14, further comprising:
- disconnecting said speakerphone loudspeaker and said speakerphone microphone from said handset connection on said base; and
- restoring said handset connection between said handset and said base of telephone.

18. Apparatus for converting a common telephone into a speakerphone, comprising:
- means for removing a handset connection between a handset and a base of said telephone; and
- means for interfacing said apparatus to a handset jack of said common telephone;
- means for temporarily connecting a speakerphone loudspeaker and a speakerphone microphone to said handset connection on said base to convert said common telephone into a speakerphone;
- wherein said apparatus is powered by a battery for portable transportation between common telephones and relies on said common telephone for dialing functions, ringing functions, and hook-switch functions.

19. The apparatus for converting a common telephone into a speakerphone according to claim 18, further comprising:
- means for amplifying an output of said handset connection on said base.

20. The apparatus for converting a common telephone into a speakerphone according to claim 19, wherein:
- said means for amplifying is powered by said battery.

21. The apparatus for converting a common telephone into a speakerphone according to claim 18, further comprising:
- means for disconnecting said speakerphone loudspeaker and said speakerphone microphone from said handset connection on said base; and
- means for restoring said handset connection between said handset and said base of said telephone.

22. A voice pager speakerphone, comprising:
- a speakerphone speaker adaptively attached to said voice pager speakerphone;
- a speakerphone microphone adaptively attached to said voice pager speakerphone;
- an external handset cord adapter; and
- an audio echo canceler adapted for operation when said communication device is connected to a telephone through said external handset cord adapter;
- said voice pager speakerphone having a voice paging mode of operation and a speakerphone mode of operation adapting said telephone for operation as a speakerphone through said speakerphone speaker and said speakerphone microphone.

23. The voice pager speakerphone according to claim 22, wherein:
- said voice pager speakerphone including said speakerphone speaker is adapted for operation when said communication device is in said voice paging mode of operation; and
- said speakerphone microphone, said audio echo canceler, and said speakerphone speaker of said voice pager speakerphone are adapted for operation when said communication device is in said speakerphone mode of operation.

* * * * *